United States Patent
Yu et al.

(10) Patent No.: US 7,117,138 B2
(45) Date of Patent: Oct. 3, 2006

(54) COUPLED QUADRILATERAL GRID LEVEL SET SCHEME FOR PIEZOELECTRIC INK-JET SIMULATION

(75) Inventors: Jiun-Der Yu, Sunnyvale, CA (US); Shinri Sakai, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 558 days.

(21) Appl. No.: 10/390,239

(22) Filed: Mar. 14, 2003

(65) Prior Publication Data

US 2004/0181383 A1 Sep. 16, 2004

(51) Int. Cl.
G06G 7/50 (2006.01)

(52) U.S. Cl. .............................. 703/9; 73/861; 73/488; 702/12; 702/100

(58) Field of Classification Search ................ 700/197; 703/2, 9; 702/189; 216/62; 347/18; 716/20
See application file for complete search history.

(56) References Cited

U.S. PATENT DOCUMENTS

| | | | | |
|---|---|---|---|---|
| 4,797,842 A | * | 1/1989 | Nackman et al. ............. | 716/20 |
| 5,459,498 A | * | 10/1995 | Seccombe et al. ............ | 347/18 |
| 5,657,061 A | * | 8/1997 | Seccombe et al. ............ | 347/18 |
| 5,989,445 A | * | 11/1999 | Wise et al. .................... | 216/62 |
| 6,161,057 A | * | 12/2000 | Nakano ....................... | 700/197 |
| 6,179,402 B1 | | 1/2001 | Suzuki et al. | |
| 6,257,143 B1 | | 7/2001 | Iwasaki et al. | |
| 6,283,568 B1 | | 9/2001 | Horii et al. | |
| 6,315,381 B1 | | 11/2001 | Wade et al. | |
| 6,322,186 B1 | | 11/2001 | Shimizu et al. | |
| 6,322,193 B1 | | 11/2001 | Lian et al. | |
| 2002/0046014 A1 | * | 4/2002 | Kennon ......................... | 703/9 |
| 2002/0107676 A1 | * | 8/2002 | Davidson ....................... | 703/9 |
| 2002/0177986 A1 | * | 11/2002 | Moeckel et al. .............. | 703/9 |
| 2003/0105614 A1 | * | 6/2003 | Langemyr et al. ............ | 703/2 |
| 2004/0006450 A1 | * | 1/2004 | Hale ........................... | 702/189 |
| 2004/0034514 A1 | * | 2/2004 | Langemyr et al. ............ | 703/2 |
| 2005/0114104 A1 | * | 5/2005 | Friedl et al. ................... | 703/2 |

OTHER PUBLICATIONS

David Arney, Joseph Flaherty☐☐An Adaptive Mesh-Moving and Local Refinement Method for Time-Dependent Partial Differential Equations☐☐ACM Transaction on Mathematical Software, vol. 16, No. 1, Mar. 1990, pp. 48-71.*

Marek Machura, Roland Sweet☐☐A Survey of Software for Partial Differential Equations.☐☐ACM Transaction on Mathematical Sofware, vol. 6, No. 4, Dec. 1980, pp. 461-488☐☐.*

(Continued)

Primary Examiner—Kamini Shah
Assistant Examiner—Cuong Van Luu

(57) ABSTRACT

Methods for finite-difference-based inkjet simulation enable more precise control of ink droplet size and shape. A discrete transformation (mapping) is constructed so that a quadrilateral grid in physical space is transferred to the uniform square grid in a computational space. Since the grid in the computational space is square, numerical finite difference differentiation can be easily done. Governing partial differential equations, including a viscosity term, a surface tension term, and a level set convection equation for two-phase flows, are derived on the quadrilateral grid and then transformed to the computational space for application on the uniform square grid. A stable and powerful numerical algorithm is developed to solve the derived and transformed equations to enable finite-difference-based ink-jet simulation.

17 Claims, 11 Drawing Sheets

OTHER PUBLICATIONS

"Projection Method for Viscous Incompressible Flow on Quadrilateral Grids", John B. Bell, et al., AIAA Journal, vol. 32, No. 10, Oct. 1994, pp. 1961-1969.

"A Second-Order Projection Method for the Incompressible Navier-Stokes Equations", John B. Bell, et al., Journal of Computational Physics, vol. 85, No. 2, Dec. 1989, pp. 257-283.

"Computing Minimal Surfaces via Level Set Curvature Flow", David L. Chopp, Mathematics Department, University of California, Berkeley, California, Journal of Computational Physics 106, pp. 77-91, 1993.

"Fronts Propagating with Curvature-Dependent Speed: Algorithms Based on Hamilton-Jacobi Formulations", Stanley Osher, Department of Mathematics, University of California, Los Angeles and James A. Sethian, Department of Mathematics, University of California, Berkeley, California, Journal of Computational Physics 79, pp. 12-49, 1988.

"A Level Set Approach for Computing Solutions to Incompressible Two-Phase Flow", Mark Sussman, et al., Department of Mathematics, University of California, Los Angeles, California, Journal of Computational Physics 114, pp. 146-159, 1994.

"A Projection Method for Incompressible Viscous Flow on Moving Quadrilateral Grids", David P. Trebotich, Department of Mechanical Engineering, University of California, Berkeley, California and Phillip Colella, Applied Numerical Algorithms Group, Lawrence Berkeley National Laboratory, Berkeley, California, Journal of Computational Physics 166, pp. 191-217, 2001.

"A Second-Order Projection Method for Variable-Density Flows", John B. Bell, et al., Lawrence Livermore National Laboratory, Livermore, California, Journal of Computational Physics 101, pp. 334-348, 1992.

* cited by examiner

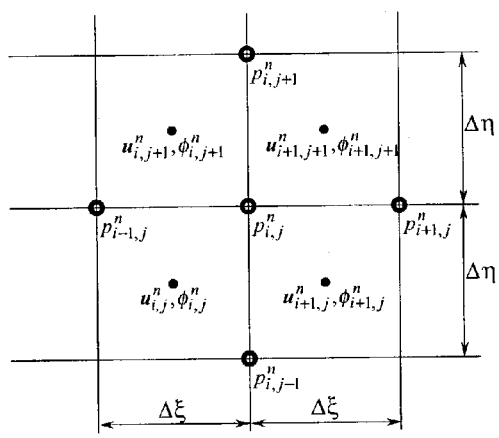
Discrete velocity field, pressure and level set
Fig. 7a
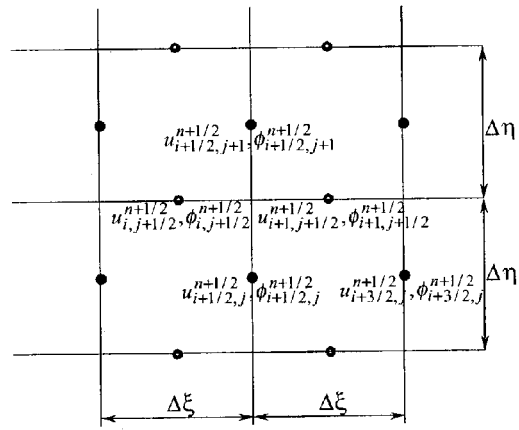
Intermediate velocity field and level set
Fig. 7b
Fig. 7

COUPLED QUADRILATERAL GRID LEVEL SET SCHEME FOR PIEZOELECTRIC INK-JET SIMULATION

RELATED APPLICATION DATA

This application is related to application Ser. No. 10/105,138, filed on Mar. 22, 2002 and entitled "A Slipping Contact Line Model and the Mass-Conservative Level Set Implementation for Ink-Jet Simulation," filed in the names of the inventors of this application. The disclosure of this related application is incorporated herein by reference.

BACKGROUND OF THE INVENTION

1. Field of the Invention

The present invention relates to a model and accompanying algorithm to simulate and analyze ink ejection from a piezoelectric print head. More particularly, the model of this invention includes a quadrilateral grid for finite-difference-based ink-jet simulation where the algorithm is designed to solve a set of partial differential equations for two-phase flows that have been newly developed on the quadrilateral grid. The quadrilateral grid is transformed to a uniform square grid, and the derivatives of various parameters (e.g., the velocities, pressure, and level set) in the newly developed partial differential equations are calculated on the uniform square grid. A stable and powerful numerical algorithm is developed to solve the derived equations. The simulation model may be embodied in software, hardware or combination thereof and may be implemented on a computer or other processor-controlled device.

2. Description of the Related Art

Results of computational fluid dynamics (CFD) ink-jet simulation have been very useful in the design of piezoelectric ink-jet print heads. FIG. 1 shows how a practical inkjet simulation may be carried out. An analytical tool such as an equivalent circuit 11 receives as an input the dynamic voltage to be applied to the piezoelectric PZT actuator and simulates the ink behavior under the influence of the ink cartridge, supply channel, vibration plate, and PZT actuator. That is, from the input voltage and an ink flow rate, the equivalent circuit 11 calculates an inflow pressure that drives the CFD code 12. The CFD code 12 then solves the governing partial differential equations, i.e., the incompressible Navier-Stokes equations for two-phase flows, for fluid velocity, pressure and interface position, and feeds back the ink flow rate to the equivalent circuit. The sequence is repeated as long as needed.

A CFD code has been used by Seiko Epson to solve the Navier-Stokes equations. Such code employs the volume of fluid method (VOF) to take into account the ink-air interface. VOF performs fairly well with regard to mass conversation but is not so accurate on surface tension aspects of fluid flow, especially when the ink droplet is smaller than 5 pico liters. However, since the capability of ejecting ultra small ink droplets is essential for any photo quality ink-jet printer today, an improved modeling method which included the level set method was adopted by Seiko Epson to more accurately capture the ink-air interface in CFD simulations. Since there is a mathematical relation between the level set and the interface curvature, and hence the surface tension, the level set method excels whenever surface tension is important.

Because solving the level set equation by finite element analysis usually results in a serious mass conservation problem, finite difference analysis is usually the best choice among numerical schemes to be used with the level set method. FIG. 2 shows a typical rectangular grid for a finite difference analysis. Since the wall of the narrowing section of the modeled nozzle is not parallel to any coordinate axis, the discretized computational domain can not faithfully fit the real nozzle wall. The body-fitted quadrilateral grid in FIG. 3 does not have that problem. While a non-rectangular quadrilateral grid like the one in FIG. 3 can be naturally handled in finite element analysis, performing a finite difference analysis on such a grid is very difficult.

The first finite difference scheme for solving the incompressible Navier-Stokes equations on quadrilateral grids works well for single-phase fluids on a two-dimensional Cartesian coordinate system. The scheme was later extended to an axisymmetric coordinate system. It was not clear, however, how to extend the algorithm to two-phase flows, to include surface tension, and to include the level set convection equation.

OBJECT AND SUMMARY OF THE INVENTION

Object of the Invention

It is therefore an object of the present invention to provide a model and accompanying algorithm to simulate and analyze ink ejection that overcomes the above problems and enables more precise control of ink droplet size and shape.

Summary of the Invention

According to one aspect of this invention, a method for simulating and analyzing fluid flow through, and ejection from, a channel is provided. The channel has a boundary between a first fluid that flows through the channel and a second fluid, and the method comprises the steps of: (a) performing finite difference analysis including solving, with reference to both a quadrilateral grid in a physical space and a uniform square grid in a computational space, equations governing the flow of the first fluid through the channel, wherein the partial differential equations were first derived for the quadrilateral grid in the physical space and then transformed to the computational space for application on the uniform square grid; and (b) simulating the flow of the first fluid through, and ejection from, the channel based on the performed finite difference analysis.

In another embodiment, a method for simulating and analyzing fluid flow through, and ejection from, a channel having a boundary between a first fluid that flows through the channel and a second fluid comprises the steps of: (a) deriving partial differential equations applicable to a quadrilateral grid in a physical space, including deriving a viscosity term, a surface tension term, and a level set convection equation for two-phase flows; (b) calculating a transformation for transforming the derived partial differential equations for application to a uniform square grid in a computational space; and (c) solving the derived and transformed partial differential equations to determine the flow of the first fluid through, and ejection from, the channel. Preferably, in step (c) the derivatives of velocity, pressure, and level set for the flow of the first fluid in the derived and transformed partial differential equations are calculated with reference to the uniform square grid in the computational space.

In another aspect, the invention involves an apparatus for simulating and analyzing fluid flow through, and ejection from, a channel having a boundary between a first fluid that flows through the channel and a second fluid. The apparatus comprises: means for performing finite difference analysis including solving, with reference to both a quadrilateral grid in a physical space and a, uniform square grid in a computational space, equations governing the flow of the first fluid through the channel, wherein the partial differential equations were first derived for the quadrilateral grid in the physical space and then transformed to the computational space for application on the uniform square grid; and means for simulating the flow of the first fluid through, and ejection from, the channel based on the performed finite difference analysis.

In another embodiment, an apparatus for simulating and analyzing fluid flow through, and ejection from, a channel having a boundary between a first fluid that flows through the channel and a second fluid comprises: means for deriving partial differential equations applicable to a quadrilateral grid in a physical space, including deriving a viscosity term, a surface tension term, and a level set convection equation for two-phase flows; means for calculating a transformation for transforming the derived partial differential equations for application to a uniform square grid in a computational space; and means for solving the derived and transformed partial differential equations to determine the flow of the first fluid through, and ejection from, the channel.

Preferably, the first fluid is ink, the second fluid is air, and the channel comprises an inkjet nozzle that is part of a piezoelectric ink-jet head.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 7a is a schematic diagram of the location of velocity field, pressure and level set components;

FIG. 7b is a schematic diagram of the location of velocity field and level set components;

DESCRIPTION OF THE PREFERRED EMBODIMENTS

I. Introduction

Figure 1:
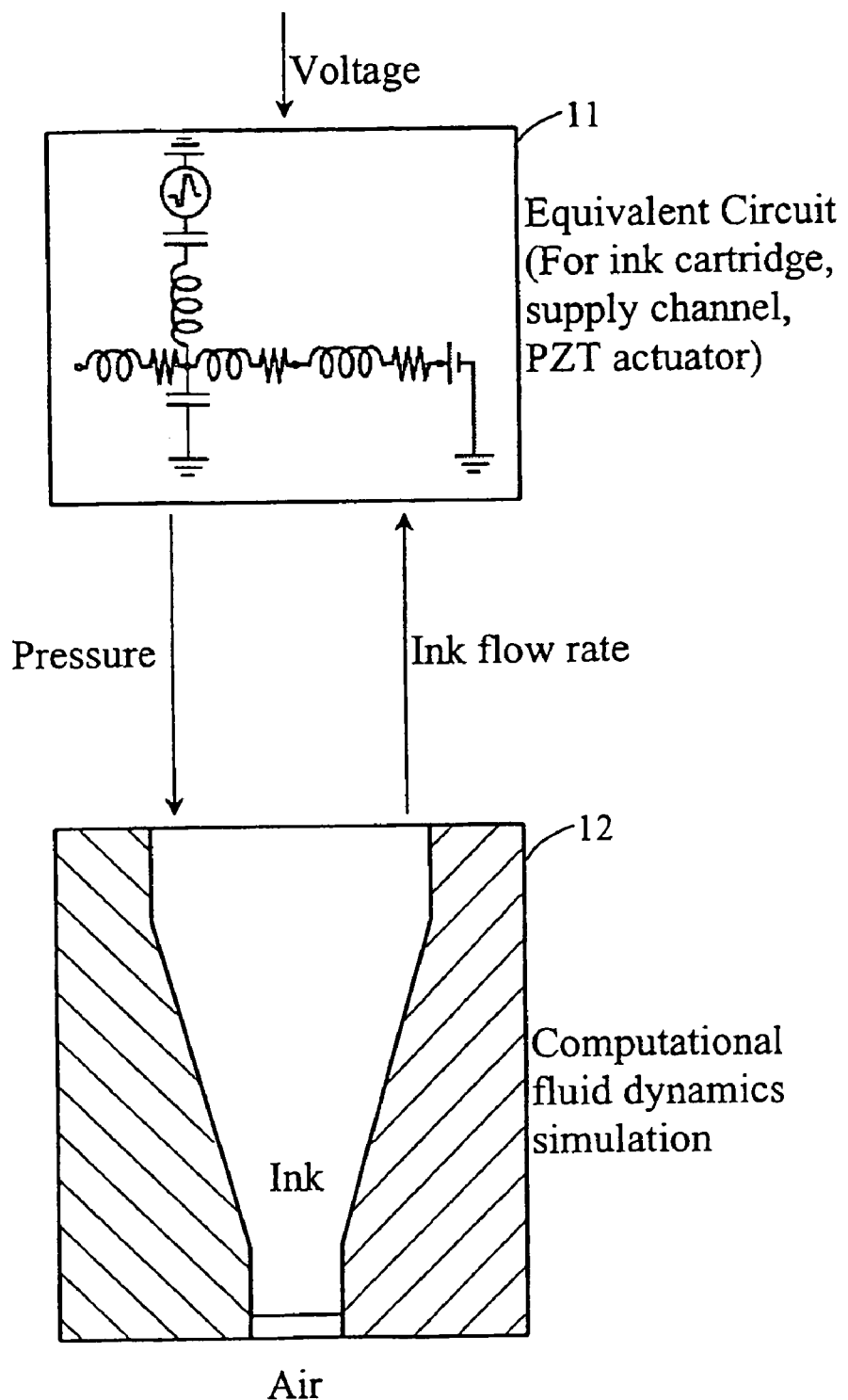
FIG. 1 is a schematic block diagram showing the interrelationship of an equivalent circuit with a computational fluid dynamics simulation according to embodiments of the invention.
Figure 2:
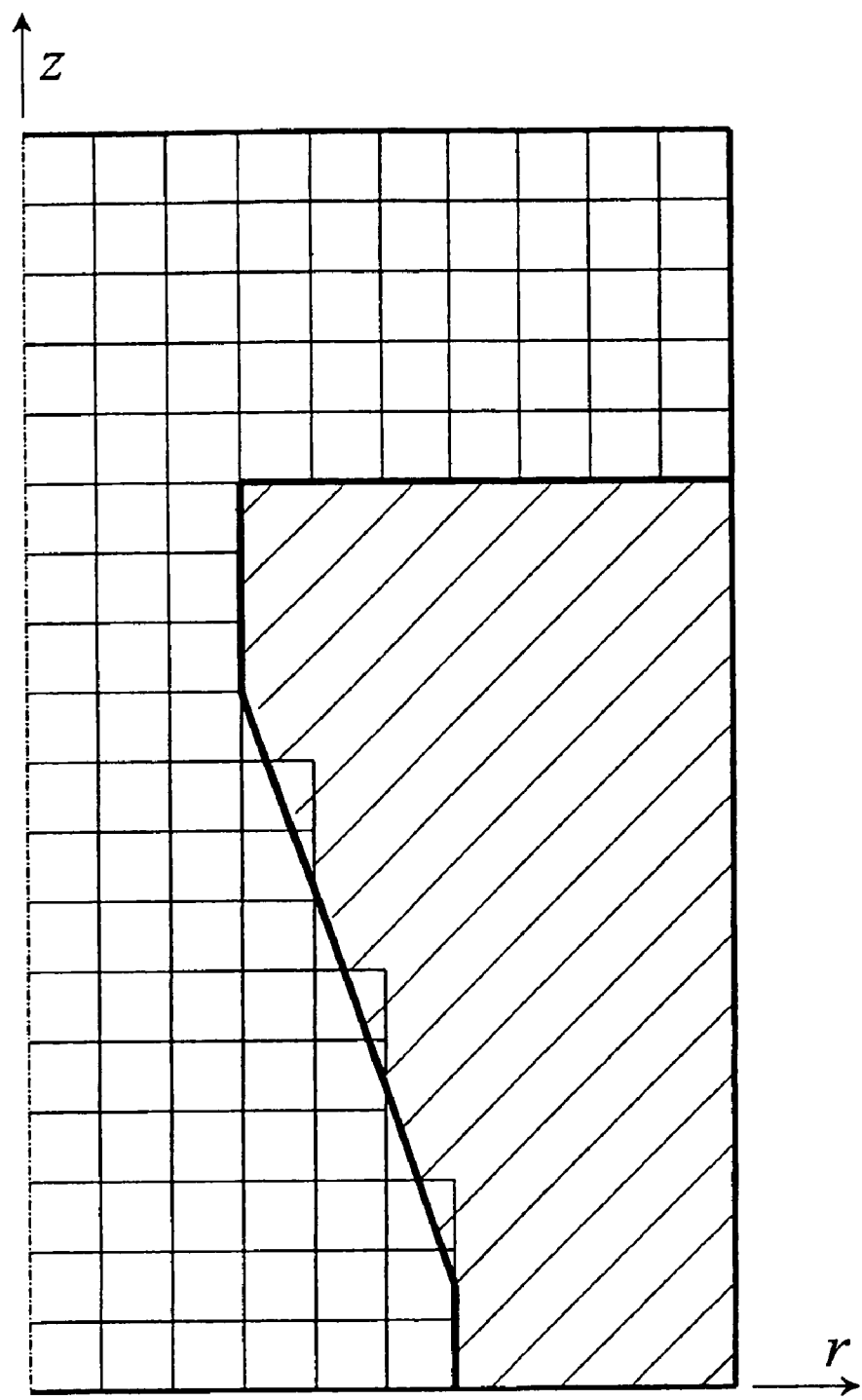
FIG. 2 shows a typical rectangular grid for inkjet simulation.

The model of this invention includes a quadrilateral grid for finite-difference-based ink-jet simulation. An accompanying algorithm is designed to solve the coupled Navier-Stokes equations and level set equations for two-phase flows that have been newly developed on the quadrilateral grid.

Governing partial differential equations, including the viscosity term, the surface tension term, and the level set convection equation for two-phase flows, are derived on the quadrilateral grid. A discrete transformation (mapping) is constructed so that the partial differential equations derived on the quadrilateral grid in physical space are transferred to the uniform square grid in a computational space to enable finite-difference-based ink-jet simulation. Since the grid in the computational space is square, numerical finite difference differentiation can be easily done. Although the governing equations assume a more complicated form after the transformation, the ease with which the equations can be solved in the computational space more than offsets the increased complication. A stable and powerful numerical algorithm is developed to solve the derived and transferred equations. In particular, the derivatives of the velocities, pressure, and level set are calculated on the uniform square grid in computational space.

II. Level Set Formulation

A. Governing Equations

The governing equations for two-phase flows include the continuity equation (1) and the Navier-Stokes equations (2), which are set forth in the Appendix along with the other numbered equations referenced in the following discussion. In these equations, the rate of deformation tensor and the fluid velocity are respectively defined in equations (3).

$$\frac{D}{Dt} = \frac{\partial}{\partial t} + (u \cdot \nabla)$$

is the Lagrangian time derivative, $\rho$ the relative density, $p$ the pressure, $\mu$ the relative dynamic viscosity, $\sigma$ the surface tension coefficient, $\kappa$ the curvature, $\delta$ the Dirac delta function, and $\phi$ the level set.

A level set formulation is used to define the interface between the two fluids, e.g., ink and air, and hence the relative density, relative dynamic viscosity, and curvature are all defined in terms of the level set $\phi$ as in equation (4).

Here, the level set function $\phi$ is initialized as the signed distance to the interface, i.e., the level set value is the shortest distance to the interface on the liquid side and is the negative of the shortest distance on the air side. The unit normal on the interface, drawn from fluid 2 into fluid 1, and the curvature of the interface can be expressed in terms of $\phi$ as in equation (5).

To make the governing equations dimensionless, the following definitions, as set forth in equation (6), are chosen. The primed quantities are dimensionless, and L,U, $\rho_1,\mu_1$, are respectively the characteristic length, characteristic velocity, density of fluid 1, and dynamic viscosity of fluid 1. The characteristic velocity and characteristic length can be arbitrarily chosen, as they do not influence the result of simulation.

Substituting the relationships of equation (6) into equations (1) and (2), and dropping the primes, yields equations (7) and (8), where the relative density ratio $\rho(\phi)$, relative viscosity ratio $\mu(\phi)$, Reynolds number Re, and Weber number We are defined by equations (9).

Since the interface moves with the fluid, the evolution of the level set is governed by equation (10).

Since equations (5), (7) and (8) are expressed in terms of the vector notation, they assume the same form in Cartesian coordinates and axi-symmetric coordinates.

B. Governing Equations on Quadrilateral Mesh

The primary interest here is in finite difference analysis in reasonably complex geometries, for which a rectangular grid may not work well. The focus is therefore a general quadrilateral grid formulation. This can be done by carefully transforming the viscosity and surface tension terms.

Figure 4:
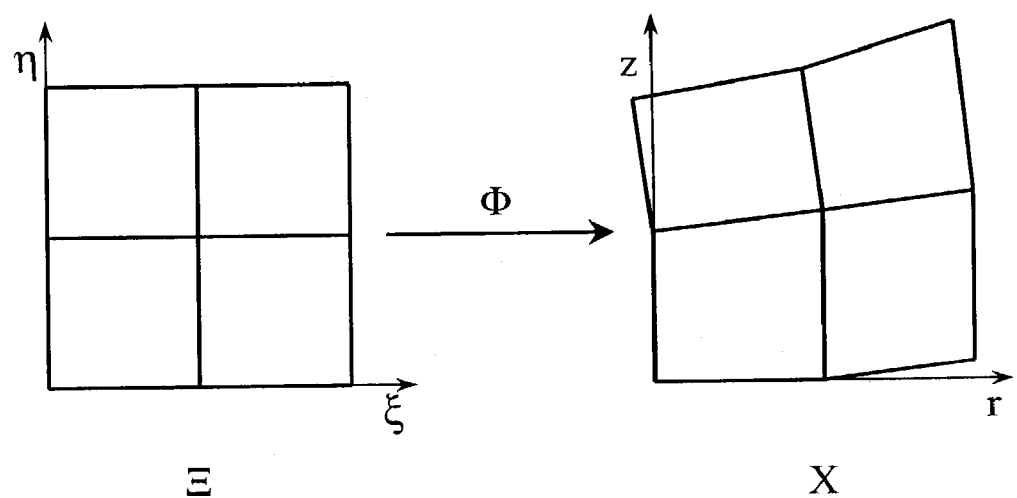
FIG. 4 illustrates the transformation of grid points in a rectangular computational space to a physical axi-symmetric space.

Consider a continuous transformation $\Phi$ which maps the grid points in a rectangular computational space $\Xi=(\xi,\eta)$ to the physical axi-symmetric space $X=(r,z)$ according to equation (11) and as shown in FIG. 4. The Jacobian and the transformation matrix are defined by equations (12), where $g=2\pi r$ for the axi-symmetric coordinate system. For the convenience of future discussion, we also define the transformed convection velocity as in equation (13).

The above definitions for axi-symmetric coordinate systems can be easily extended to the two-dimensional Cartesian system by the substitution shown in equation (14).

The derivation of the governing equations on the computational space will now be described in the following sub-sections.

B.1. Pressure Gradient

The pressure gradient on the quadrilateral grid can be obtained by the chain rule as shown in equations (15).

B.2. Continuity Condition

The divergence-free continuity condition on the quadrilateral grid is shown in equation (16). To prove this, expand the right hand side as shown in equations (17).

B.3. Convection Term

By combining the transformations in equations (15) and (17), the convection term set forth in equation (18) is obtained. The convection term in the level set equation can be transformed similarly.

B.4. Viscosity Term

For the transformation of the viscosity term for two-phase flows, the identity set forth in equation (19) is needed. Noting the relationship in equation (20) yields equation (21).

The first term on the right hand side of equation (21) vanishes for single phase flows with constant viscosity. However, it plays an important role for two phase flows. In an axi-symmetric coordinate system, the Laplacian operator in the second term is as set forth in equation (22). By noting the relationships in equations (23) and (24), equation (25) is obtained. By combining equations (21) and (25) the viscosity term in computational space is obtained. The viscosity term is set forth in equation (26).

B.5. Curvature and Surface Tension

Given the relationship in equation (27), the surface tension term is shown in equation (28).

Combining equations (17) to (28), the governing equations on the quadrilateral grid are obtained. These governing equations are set forth in equation (29), where the viscosity terms are as given in equation (26).

It will be noted that equations (15) to (29) are derived for a quadrilateral grid in the axi-symmetric coordinate system; however, they can be used for two-dimensional flow problems if the last term in equation (25) is neglected and the substitution in equation (14) is used. Also, equation (25) can be checked by reducing the computational space $\Xi=(\xi,\eta)$ to the physical space $X=(r, z)$. For this case, the transformation matrix reduces to the identity matrix and the Jacobian to g. Furthermore, it should be noted that $\nabla_\Xi$ and $\nabla_\Xi\bullet$ are "matrix operators" while $\nabla$ and $\nabla\bullet$ are vector operators. When a vector operator is put in front of a vector quantity, it not only "operates" on the magnitude of the vector quantity but also on the direction. Here, the matrix operators $\nabla_\Xi$ and $\nabla_\Xi\bullet$ are applied to scalars or matrices, and hence the "direction" is not relevant.

C. Boundary Conditions

On solid walls it is assumed that the normal and tangential components of the velocity vanishes, although this assumption must be modified at the triple point. At both inflow and outflow, the formulation of this invention allows us to prescribe either the velocity (30) or the pressure (31) as boundary conditions. In equation (31), the symbol n denotes the unit normal to the inflow or outflow boundary. Time-dependent inflow conditions are provided by an equivalent circuit model which mimics the charge-driven mechanism which forces ink from the bath into the nozzle.

D. Contact Models

At the triple point, where air and ink meet at the solid wall, the slipping contact line model as presented in related application Ser. No. 10/105,138 referenced above is used.

E. Equivalent Circuit

In a piezo ink-jet print head, the formation of the ink droplet is controlled by a piezoelectric PZT actuator. Driven by the input voltage, the PZT pushes and then pulls the ink. To numerically simulate an ink-jet print head, a velocity or pressure at nozzle inflow must be specified. Various appropriate values of these parameters may be specified by the user before simulation, or such values may be the result of previous measurements taken at different voltages input to PZT, since this voltage value is known.

Another analytic tool that may be developed and used to obtain inflow pressures that may be used for simulation of the ink-jet print head is an equivalent circuit. Such an equivalent circuit determines inflow pressure based on input voltage and ink flow rate. For example, the ink flow rate and pressure can be taken as independent variables. Each component of the ink-jet print head, such as the nozzle, pressure chamber, vibration plate, PZT actuator, and ink cartridge is expressed in terms of the acoustics inertance, compliance, and acoustics resistance. These acoustics elements are finally transferred to their equivalent inductance, capacitance, and electric resistance to form an equivalent circuit. By solving the equivalent circuit and the flow equations in term a real ink-jet head can be simulated. Other suitable methods may also be used to obtain inflow pressure values that relate to the PZT input voltage.

Figure 5:
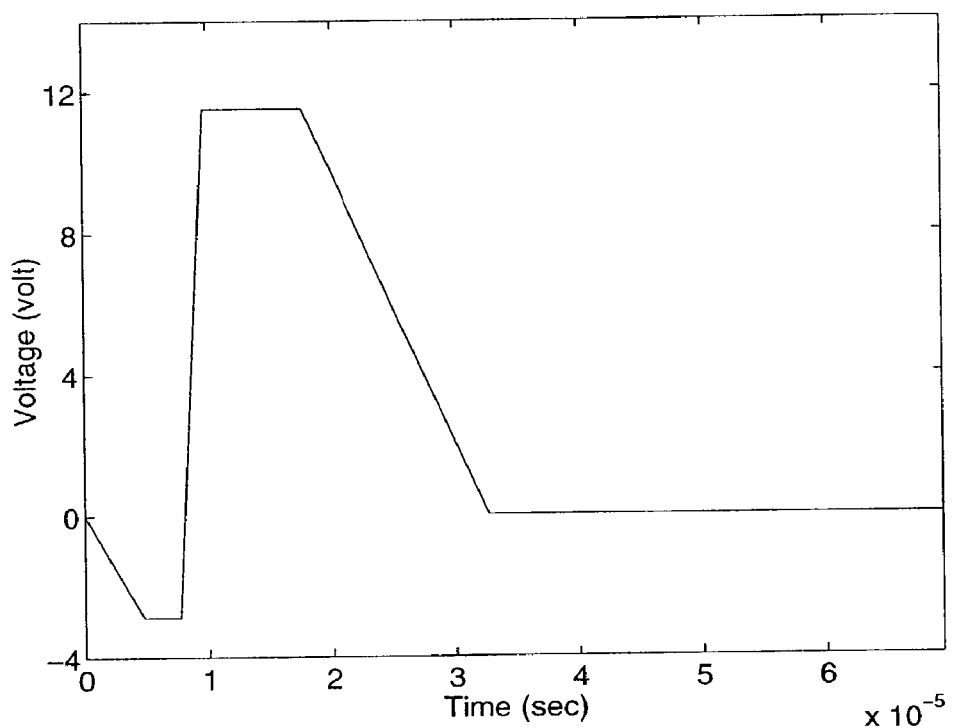
FIG. 5 is a graphical illustration of a typical ink-jet driving voltage with respect to time over one cycle.
Figure 6:
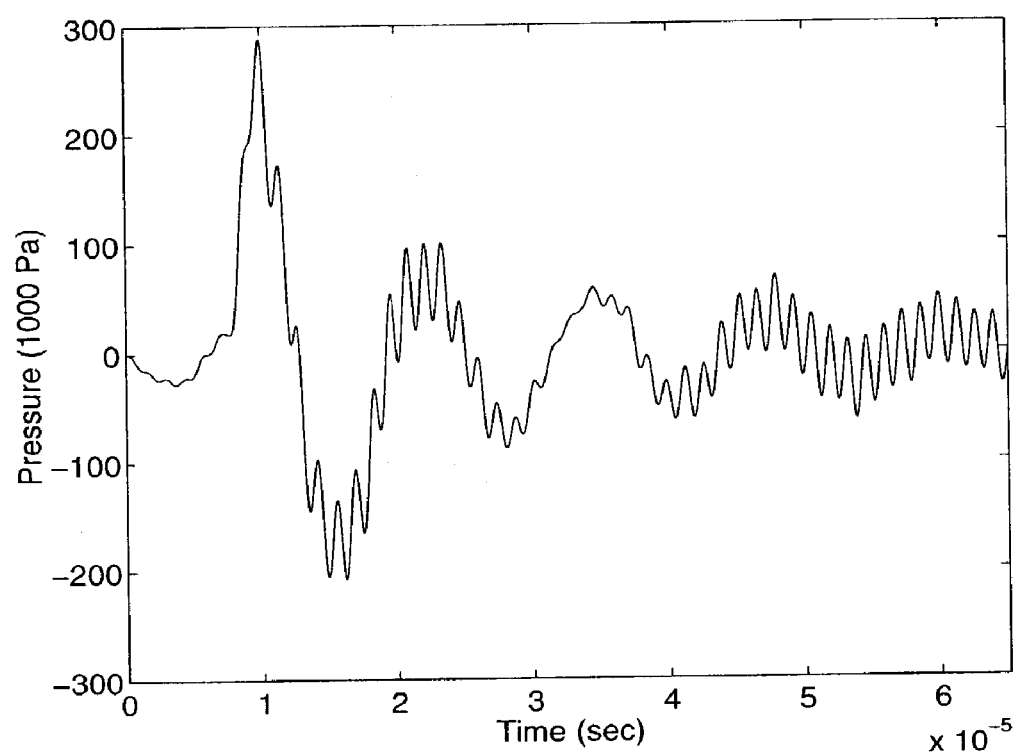
FIG. 6 is a graphical illustration of a typical ink-jet inflow pressure with respect to time over one cycle.

A typical driving voltage pattern and a typical inflow pressure are as shown in FIGS. 5 and 6. The driving voltage is such that the ink is first pulled back, pushed and fired, and then pulled back to get ready for the next discharge. The inflow pressure shown in FIG. 6 reflects the reaction of a typical nozzle-ink channel-PZT-cartridge system to the applied voltage. The pressure pattern contains several high frequency signals. The biggest one is basically the fundamental natural frequency of the system, which is five to six times higher than the driving voltage frequency in this case.

The small oscillations are probably related to the natural frequencies of the components in the system.

III. Numerical Algorithms: Quadrilateral Grids

The numerical algorithm is now formulated on the quadrilateral grids. In the following, the superscript n (or n+1) denotes the time step, i.e., equation (32), and so on.

Given quantities $u^n, p^n, \phi^n$, the purpose of the algorithm is to obtain $u^{n+1}, p^{n+1}, \phi^{n+1}$ which satisfy the condition of incompressibility. The explicit algorithm described herein is first-order accurate in time and second-order accurate in space.

A. Smearing of the Interface

Because of the numerical difficulty caused by the Dirac delta function and by the abrupt change of the density and viscosity across the interface, we have to replace the Heaviside unit step and Dirac delta functions with smoothed ones, i.e., to smear the interface a little bit. The Heaviside function is redefined by equation (33). By the relation between the Dirac delta and the Heaviside functions in (34), we can easily obtain the smoothed Dirac delta function.

The parameter $\epsilon$ is usually chosen to be proportional to the average size of cells as set forth in (35), where $\Delta x$ is the average size of the quadrilateral cells. We usually choose an $\alpha$ between 1.7 and 2.5.

B. Temporal Discretization

B.1. Level Set Update

The level set is updated first by equation (36). The time-centered advection term $[\bar{u} \cdot \nabla_\Xi \phi]^{n+1/2}$ is evaluated using an explicit predictor-corrector scheme that requires only the available data at $t^n$. The detail will be explained in the next sub-section. Once $\phi^{n+1}$ is obtained, $\phi^{n+1/2}$ is computed by equation (37).

B.2. Explicit Algorithm for Navier-Stokes Equations

In previous work, temporal discretization has been constructed as explicit for the advection term and semi-implicit for the viscosity term. The advantage of the semi-implicity is the second-order accuracy in time. The expense is that one needs to solve an extra non-symmetric linear system in each time step. In this invention, an explicit temporal discretization is applied to the viscosity term to reduce the CPU time, as set forth in equation (38). Using the definition of equation (39), the time-discretized Navier-Stokes equations can be written as set forth in equation (40).

We apply a second-order explicit Godunov scheme for the advection term and the central difference for the viscosity term in equation (39). They will be explained later. It is noticeable that the time-centered level set $\phi^{n+1/2}$ and the velocity $u^n$ for the evaluation of the (viscosity term)$^n$ is used. The determination of $u^*$ needs only field quantities at time step n.

Since the finite-element projection is used, for which the special quadrilateral formulation (40) is unnecessary, the corresponding equation in the physical grid is written as in equation (41).

B.3. Projection for $u^{n+1}$

To satisfy the incompressibility condition for time step n+1 the divergence operator is applied to both sides of equation (41). Since $\nabla \cdot u_{n+1}$, we have projection equation (42) which is elliptic. It reduces to a Poisson's equation if the density ratio $\rho(\phi^{n+1/2})$ is a constant. The finite element formulation, shown in equation (43) where $\Gamma_1$ denotes all the boundary with given inflow or outflow velocity $u^{BC}$, is used to facilitate implementation. It can be seen by the divergence theory, that the implied boundary condition at $\Gamma_1$ is as shown in equation (44). It is noticeable that the second term at the right hand side of (43) vanishes if only boundary pressures are given at the inflow and outflow.

After the pressure $p^{n+1}$ is solved from equation (43), the velocity field $u^{n+1}$ can be obtained by equation (40).

B.4. Re-Initialization of the Level Set

To correctly capture the interface and accurately calculate the surface tension, the level set needs to be maintained as a signed distance function to the interface. However, if the level set is updated by equation (7), it will not remain as such. Therefore, instead, the simulation is periodically stopped and a new level set function $\phi$ is recreated which is the signed distance function, i.e., $|\nabla \phi|=1$, without changing the zero level set of the original level set function.

The need to do so in level set calculations has been previously recognized, as has re-initialization. A direct and simple method for re-initialization is to first find the interface (the zero level set) using a contour plotter and then recalculate the signed distance from each cell to the interface. Another simple re-initialization choice is to solve the crossing time problem as set forth in equation (45), where F is a given normal velocity. It is noticeable that t' has been used in equation (45) to emphasize that it is a pseudo time variable and the equation is solved solely for the purpose of re-initialization. With F=1, flow the interface forward and backward in time and calculate the time t' at which the level set function changes sign for each cell. The crossing times (both positive and negative) are equal to the signed distances.

Either of these two simple methods are suitable for use with the present invention. Both have been tried with no noticeable difference in simulation results. Other re-initialization techniques which may be used can be found in the text: "Level Set Methods and Fast Marching Methods" by James A. Sethian, second edition, Cambridge University Press, 1999.

C. Spatial Discretization

C.1. The Quadrilateral Grid

Referring to FIGS. 7a and 7b, the velocity components $u_{i,j}^n$ and the level set $\phi_{i,j}^n$ are placed at cell centers, and the pressure $p_{i,j}^n$ is placed at grid points. The time-centered edge velocities and the level set "predictors," like $u_{i+1/2,j}^{n+1/2}$, $\phi_{i+1/2,j}^{n+1/2}$, and so on, are at the middle point of each edge. How to obtain these time-centered edge quantities will be explained later in this sub-section.

Figure 3:
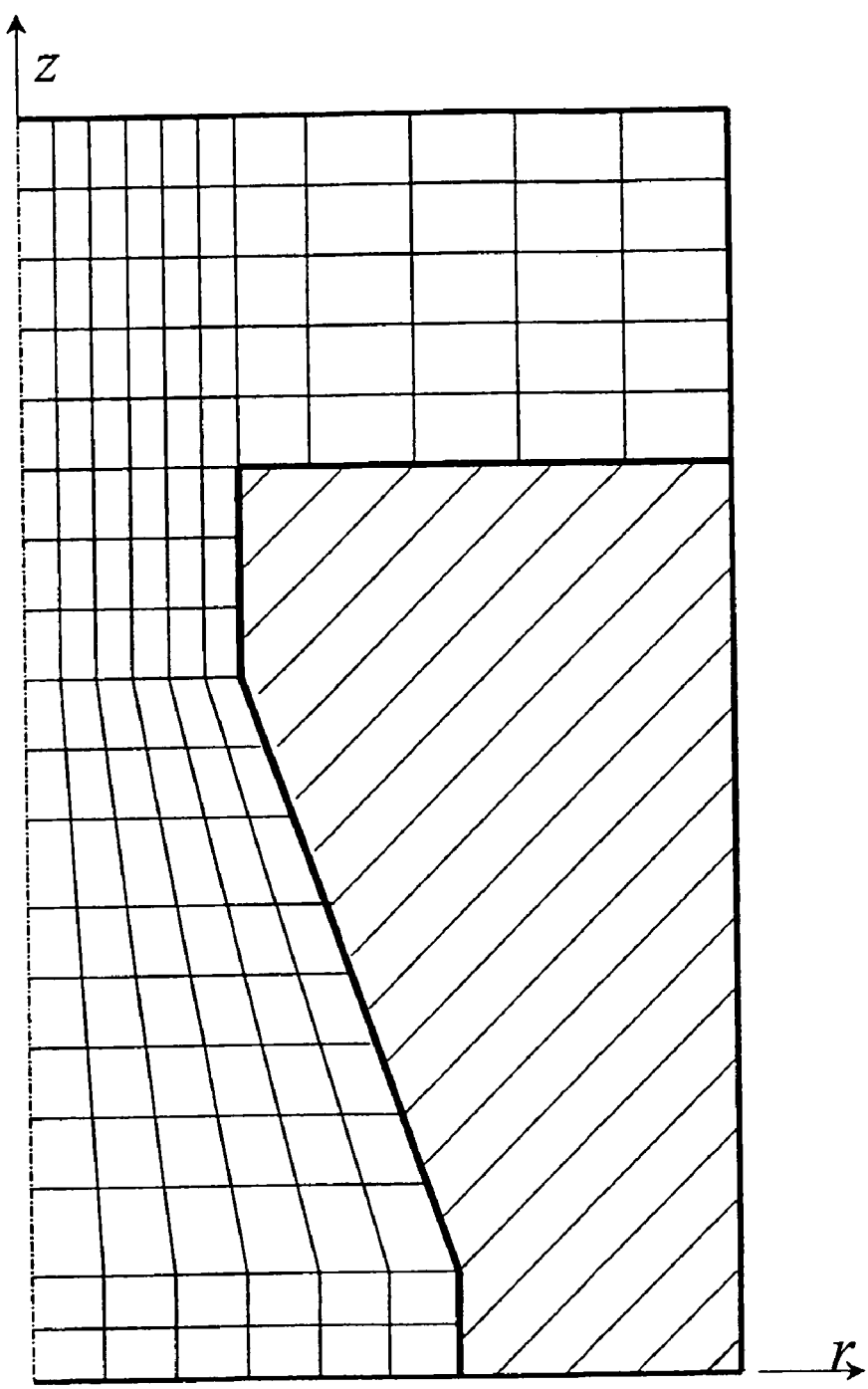
FIG. 3 illustrates a boundary-fitted quadrilateral grid for ink-jet simulation.
Figure 8:
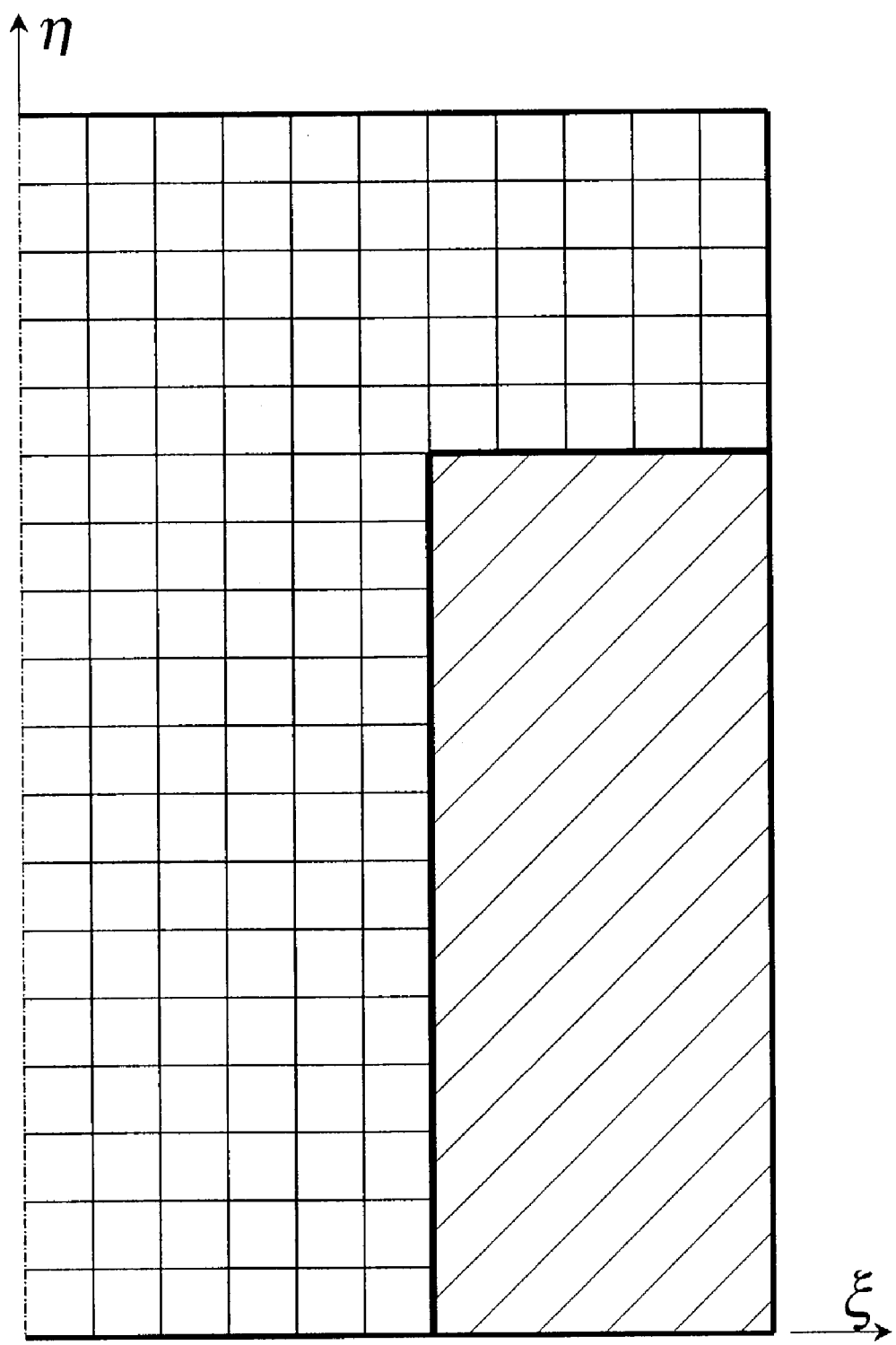
FIG. 8 shows a uniform square grid in computational space.

The transformation $X=\Phi(\Xi)$ is such that the grid in the computational space is composed of unit squares, i.e., the grid in the computational space has $\Delta \xi = \Delta \eta = 1$. The boundary-fitted quadrilateral grid and the nozzle wall in FIG. 3 are mapped to the uniform computational grid and the rectangular hatched area in FIG. 8.

The coordinates of the cell centers in the physical space are as shown in equation (46). Differences of the grid points are used to define the elements of the transformation matrix at cell centers. See equation (47) for example.

Note that only the local definition of the transformation (or mapping) is needed in the algorithm. The existence or the exact form of the global transformation $X=\Phi(\Xi)$ is not important.

C.2. The Advection Term

The algorithm for the advection terms is based on the unsplit Godunov method as introduced in John B. Bell, Phillip Colella, and Harland M. Glaz, "*A Second-order Projection Method for the Incompressible Navier-Stokes Equations,*" Journal of Computational Physics, 85(2), pp. 257–283, 1989, for one fluid incompressible flows and extended by John B. Bell and Daniel L. Marcus, "*A Second-*

*order Projection Method for Variable-Density Flows,"* Journal of Computational Physics, 101, pp. 334–348, 1992, for two-phase (two constant densities) flows. It is a cell-centered predictor-corrector scheme.

To evaluate the advection terms (the corrector step), equations (48) and (49) are used. In these equations the edge velocities and edge level sets are obtained by Taylor's expansion in space and time. The time derivative $u_t^n$ and $\phi_t^n$ are substituted by the Navier-Stokes equations and the level set convection equation. Extrapolation is done from both sides of the edge and then the Godunov type upwinding is applied to decide which extrapolation to use. How to obtain $u_{i+1/2,j}^{n+1/2}$ is now explained. The other time-centered edge values may be derived in a similar way. Extrapolate from the left, yielding equation (50) where $F_{i,j}^n$ is as given in equation (51). Extrapolate from the right yielding equation (52).

The monotonicity-limited central difference is used for the evaluation of the normal slopes, which is $u_{\xi,i,j}^n$ in this case. The limiting is done on each component of the velocity at $t^n$ separately. The tranverse derivative term $$(\overline{v}u_\eta)_{i,j}^n$$

is evaluated by the simple upwind scheme. The detailed formula is given later in this application.

The next step is the Godunov upwinding. The advective velocities are decided by equations (53) and (54). These edge advective velocities are, in general, not divergence-free. An intermediate MAC projection is needed to make all the normal edge velocities divergence-free. Suppose q is a function which is smooth enough and $u^e$ are the edge velocities obtained as in equations (50)–(54). It is desired that equation (55) be divergence-free. Taking the divergence of equation (55), yields equation (56). In a quadrilateral grid the above MAC projection equation is written as equation (57). The boundary conditions for q are similar to those for the pressure. At the outflow q=0 is used. At the inflow, the boundary condition (58) is used.

After q is solved, the edge advective velocities are replaced by equation (59).

Evaluation of the Normal Derivatives

The normal derivatives in equations (50) and (52) are evaluated using the monotonicity-limited central difference. The central, forward, and backward differences are first calculated as shown in equation (60). These values are then used to define the limiting slope as set forth in equation (61). The second-order limited slope is given in equation (62).

Evaluation of the Tangential Derivatives

In the Taylor extrapolation of equations (50) and (52), the derivatives normal to the edge are computed using the monotonicity-limited central difference scheme. However, for the sake of stability, the tangential derivative should be computed using some upwind schemes. One way of doing that is shown in equation (63).

C.3. The Viscosity Term

Because the discretization of the first part of the viscosity term in equation (21) is straightforward, only the discretization of the Laplacian term is shown. The Laplacian in the computational coordinates has the form shown in equation (64), where $\alpha,\beta$, and $\gamma$ are defined as set forth in equations (65). Each term in equation (64) is discretized using standard central differences with coefficients computed by averaging elements of the transformation matrix.

D. Constraint on Time Step

Since the time integration scheme is second-order explicit for the convection term and first-order explicit for viscosity, the constraint on time step $\Delta t$ is determined by the CFL condition, surface tension, viscosity, and total acceleration, as shown in equation (66), where $h=\min(\Delta r,\Delta z)$ and F is defined in equation (51).

E. The Flowchart

Figure 9:
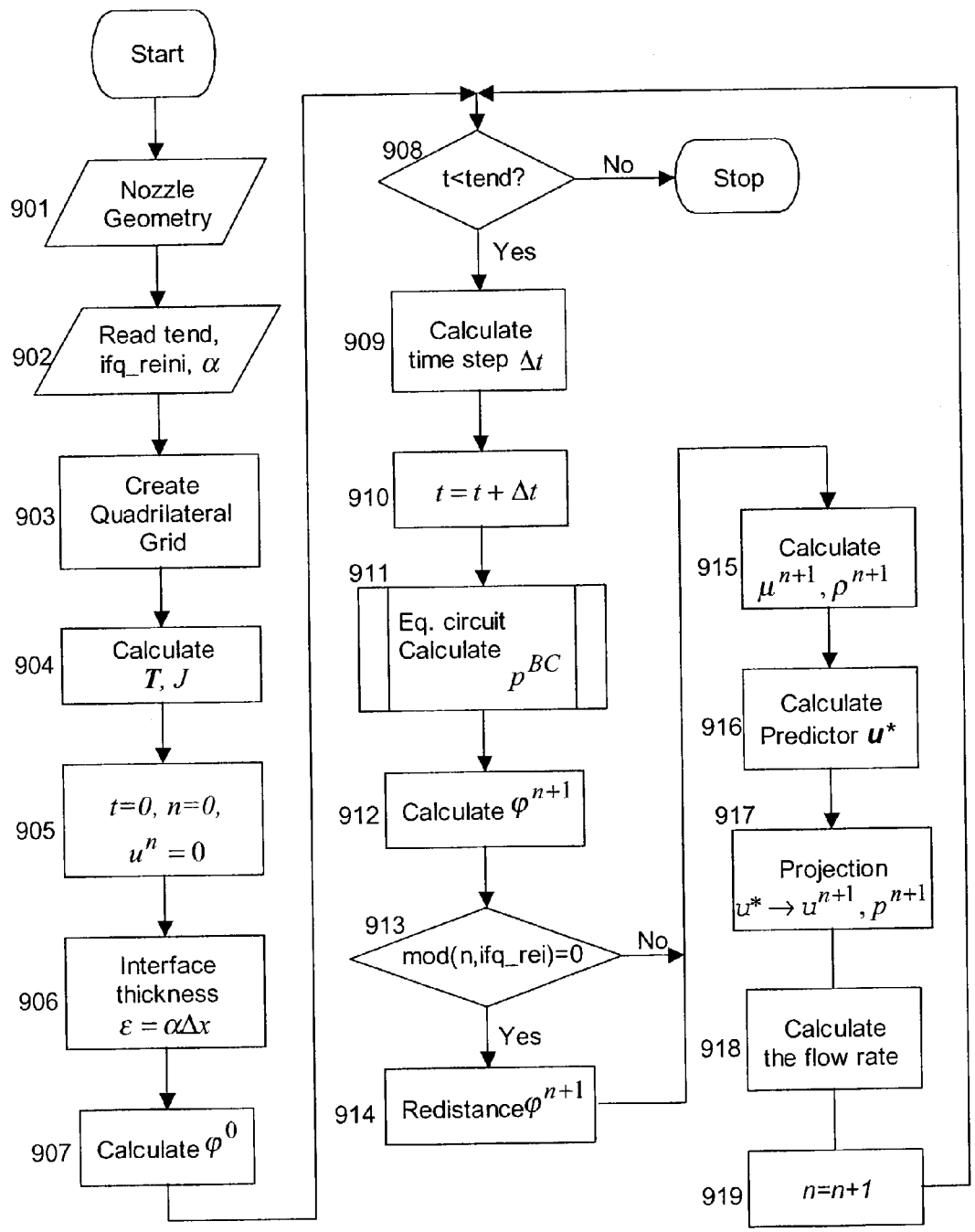
FIG. 9 is a flow chart illustrating the numerical algorithm according to embodiments of the invention.

As shown by the flowchart in FIG. 9, the numerical algorithm is basically sequential. The code first reads the nozzle geometry (step 901) and also reads control parameters like tend (end time of the simulation), $\alpha$ (the extent of interface smearing), ifq_reini (how often the level set should be re-initialized) (step 902). With the given nozzle geometry, the code creates a body-fitted quadrilateral grid like in FIG. 3 (step 903), and calculates the transformation matrix T and the Jacobian J using equation (12) (step 904). The time and the number of the current time step are set to zero and the initial fluid velocity is set to zero everywhere (step 905). With the given smearing parameter ($\alpha$), the interface thickness is set using equation (35) (step 906). The level set $\phi^0$ is then initialized by assuming the initial ink-air interface is flat (step 907).

Now the time loop starts by checking whether t<tend (step 908). If so, the time step $\Delta t$ is determined by equation (66) to ensure the stability of the code (step 909). The time is updated (step 910). The time step and the ink flow rate (the initial flow rate is zero) are then passed to an equivalent circuit or like analytic tool, which calculates the inflow pressure for the current time step (step 911). After receiving the inflow velocity from the equivalent circuit, the CFD code goes ahead to solve the partial differential equations. The level set is first updated using equation (36) (step 912) and, for every ifq_reini time steps, is also re-distanced (steps 913 and 914). The new fluid viscosity and density are calculated using the new level set values (step 915). The velocity predictor equation (39) is then calculated (step 916). Finally, the predictor velocity is projected into the divergence-free space to get the new pressure and incompressible velocity fields (step 917). The last things to do in the loop are calculating the ink flow rate (step 918) and updating the number of the time step (step 919).

IV. Ink-Jet Simulation

As an example of ink-jet simulation, consider a typical nozzle as shown in FIG. 1. The diameter is, for example, 25 microns at the opening and 51.4 microns at the bottom. In the illustrated embodiment, the length of the nozzle opening portion (i.e., where the diameter is 25 microns) is 25 microns, the length of tapered section is 55 microns, and the length of the bottom portion is 7.5 microns.

The inflow pressure is given by an equivalent circuit which simulates the effect of the ink cartridge, supply channel, vibration plate, PZT actuator, applied voltage, and the ink inside the channel and cartridge. In this example, the input voltage is given in FIG. 5, the corresponding inflow pressure is as shown in FIG. 6, and the outflow pressure at the top of the solution domain is set to zero.

In this example, the solution domain was chosen to be $\{(r,z)|0\leq r\leq 31.25\ \mu m,\ 0\leq z\leq 380\ \mu m\}$. The contact angle was assumed to be 90° all the time and the initial meniscus is assumed to be flat and 2.6 microns under the nozzle opening. An interface smearing $\alpha=2$ was used in the code.

Figure 10:
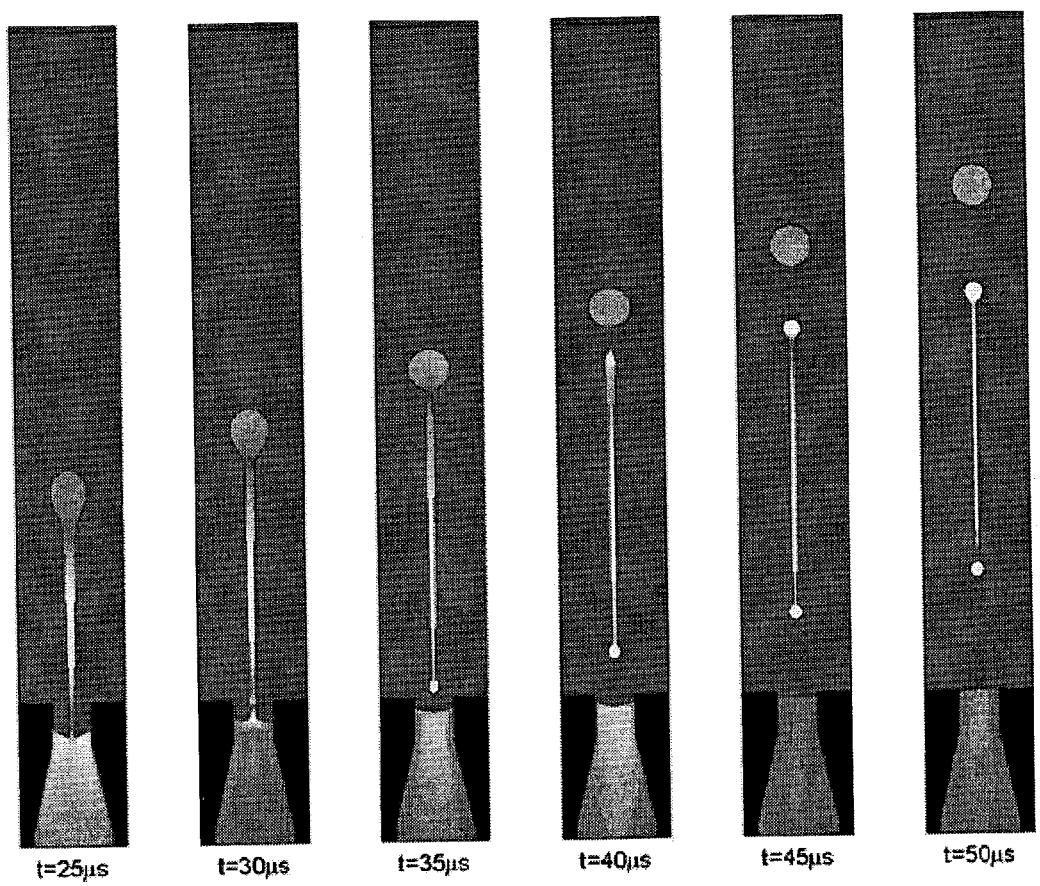
FIG. 10 is a sequence of images illustrating the ejection of a large ink droplet from an ink-jet printer.

For the purpose of normalization, the nozzle opening diameter (25 microns) is selected to be the length scale and 6 m/s is selected to be the velocity scale. The normalization solution domain is hence $\{(r,z)|0\leq r\leq 1.25\ \mu m,\ 0\leq z\leq 15.2$ μm}. Since the density, viscosity, and surface tension of ink are approximately as given in equations (67), the non-dimensional parameters of equations (68) are obtained. Simulation results are shown in FIG. 10. The ink droplet is pinched off inside the nozzle after t=30 μs. Its tail exits the nozzle opening at t=35 μs. The droplet then separates into a major droplet and satellites.

V. Implementations and Effects

The main features of the simulation model, namely, a discrete transformation for transferring a quadrilateral grid in the physical space to a uniform square grid in the computational space to enable finite-difference-based ink-jet simulation; derivation of governing partial differential equations, including derivation of the viscosity term, the surface tension term, and the level set convection equation for two-phase flows, on the quadrilateral grid; transformation of those equations for application on the uniform square grid; and development of a stable and powerful numerical algorithm to solve the derived and transformed equations, provide a more accurate way to simulate and analyze ink ejection that overcomes the previously encountered problems and enable more precise control of ink droplet size and shape.

Figure 11:
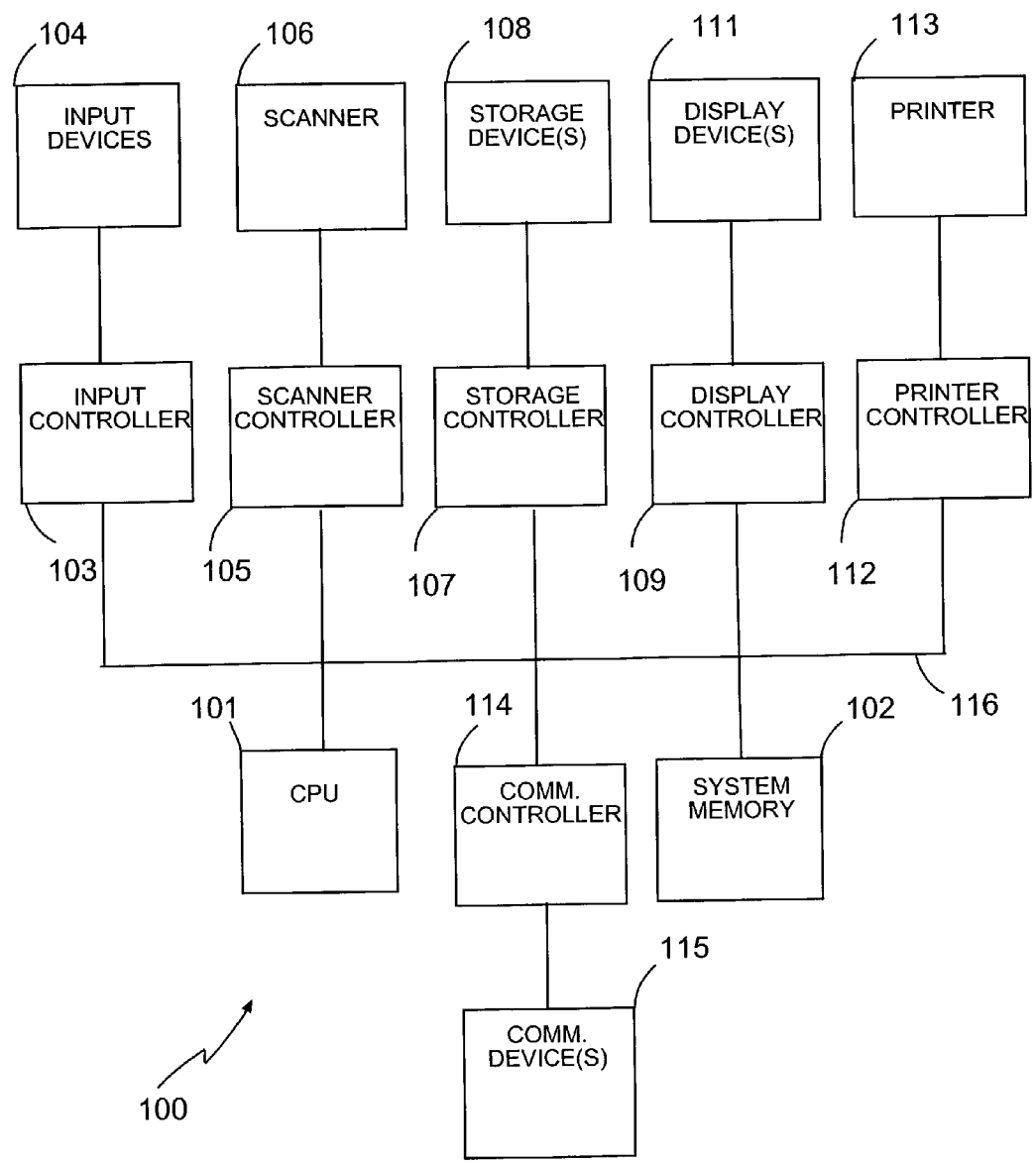
FIG. 11 is a block diagram illustrating an exemplary system which may be used to implement aspects of the present invention.

Having described the details of the invention, an exemplary system 100 which may be used to implement one or more aspects of the present invention will now be described with reference to FIG. 11. As illustrated in FIG. 11, the system includes a central processing unit (CPU) 101 that provides computing resources and controls the computer. CPU 101 may be implemented with a microprocessor or the like, and may also include a graphics processor and/or a floating point coprocessor for mathematical computations. System 100 further includes system memory 102 which may be in the form of random-access memory (RAM) and read-only memory (ROM).

A number of controllers and peripheral devices are also provided, as shown in FIG. 11. Input controller 103 represents an interface to various input devices 104, such as a keyboard, mouse or stylus. There is also a controller 105 which communicates with a scanner 106. A storage controller 107 interfaces with one or more storage devices 108 each of which includes a storage medium such as magnetic tape or disk, or an optical medium that may be used to record programs of instructions for operating systems, utilities and applications which may include embodiments of programs that implement various aspects of the present invention. Storage device(s) 108 may also be used to store processed or data to be processed in accordance with the invention. A display controller 109 provides an interface to a display device 111 which may be a cathode ray tube (CRT) or thin film transistor (TFT) display. A printer controller 112 is also provided for communicating with a printer 113. A communications controller 114 interfaces with one or more communication devices 115 which enables system 100 to connect to remote devices through any of a variety of networks including the Internet, a local area network (LAN), a wide area network (WAN), or through any suitable electromagnetic carrier signals including infrared signals.

In the illustrated system, all major system components connect to bus 116 which may represent more than one physical bus. However, various system components may or may not be in physical proximity to one another. For example, input data and/or output data may be remotely transmitted from one physical location to another. Also, programs that implement various aspects of this invention may be accessed from a remote location (e.g., a server) over a network. Such data and/or programs may be conveyed through any of a variety of machine-readable medium. Machine-readable medium are divided into two groups, one being storage medium and the other being transmission medium. Storage medium includes magnetic tape or disk or optical disc. Transmission medium includes any other suitable electromagnetic carrier signals including infrared signals.

The present invention may be conveniently implemented with software. However, alternative implementations are certainly possible, including a hardware and/or a software/hardware implementation. Any hardware-implemented functions may be realized using ASIC(s), digital signal processing circuitry, or the like. Accordingly, the "means" terms in the claims are intended to cover both software and hardware implementations. Similarly, the term "machine-readable medium" as used herein includes software, hardware having a program of instructions hardwired thereon, or combination thereof. With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

$$\nabla \cdot u = 0. \tag{1}$$

$$\rho(\phi)\frac{Du}{Dt} = -\nabla p \nabla \cdot (2\mu(\phi)\mathcal{D}) - \sigma\kappa(\phi)\delta(\phi)\nabla\phi. \tag{2}$$

$$\mathcal{D} = \frac{1}{2}[\nabla u + (\nabla u)^T], \tag{3}$$

$$u = ue_1 + ve_2.$$

$$\phi(x, y, t) \begin{cases} < 0 & \text{if } (x, y) \in \text{fluid \#2 (air)} \\ = 0 & \text{if } (x, y) \in \text{interface} \\ > 0 & \text{if } (x, y) \in \text{fluid \#1 (ink)} \end{cases}. \tag{4}$$

$$n = \frac{\nabla \phi}{|\nabla \phi|}\Big|_{\phi=0}, \tag{5}$$

$$\kappa = \nabla \cdot \left(\frac{\nabla \phi}{|\nabla \phi|}\right)\Big|_{\phi=0}.$$

$$x = Lx', y = Ly', u = Uu', t = \frac{L}{U}t', \tag{6}$$

$$p = \rho_1 U^2 p', \rho = \rho_1 \rho', \mu = \mu_1 \mu'.$$

$$\nabla \cdot u = 0. \tag{7}$$

$$\frac{Du}{Dt} = -\frac{1}{\rho(\phi)}\nabla p + \frac{1}{\rho(\phi)Re}\nabla \cdot (2\mu(\phi)\mathcal{D}) - \frac{1}{\rho(\phi)We}\kappa(\phi)\delta(\phi)\nabla\phi. \tag{8}$$

$$\rho(\phi) = \begin{cases} 1 & \text{if } \phi \geq 0 \\ \rho_2/\rho_1 & \text{if } \phi > 0 \end{cases}, \tag{9}$$

$$\mu(\phi) = \begin{cases} 1 & \text{if } \phi \geq 0 \\ \mu_2/\mu_1 & \text{if } \phi < 0 \end{cases},$$

$$Re = \frac{\rho_1 UL}{\mu_1},$$

$$We = \frac{\rho_1 U^2 L}{\sigma}.$$

-continued $$\frac{\partial \phi}{\partial t} + u \cdot \nabla \phi = 0. \quad (10)$$

$$X = \Phi(\Xi). \quad (11)$$

$$J = g\det\nabla_\Xi \Phi = g\det\begin{pmatrix} r_\xi & r_\eta \\ z_\xi & z_\eta \end{pmatrix},$$

$$T = g^{-1}J[\nabla_\Xi \Phi]^{-1} = \begin{pmatrix} z_\eta & -r_\eta \\ -z_\xi & r_\xi \end{pmatrix}. \quad (12)$$

$$\bar{u} = gTu \quad (13)$$

$$r \to x, \; z \to y, \; g \to 1. \quad (14)$$

$$\nabla p = \begin{pmatrix} p_r \\ p_z \end{pmatrix} = \begin{pmatrix} p_\xi \xi_r + p_\eta \eta_r \\ p_\xi \xi_z + p_\eta \eta_z \end{pmatrix} \quad (15)$$

$$= \begin{pmatrix} \xi_r & \eta_r \\ \xi_z & \eta_z \end{pmatrix}\begin{pmatrix} p_\xi \\ p_\eta \end{pmatrix}$$

$$= gJ^{-1}\begin{pmatrix} z_\eta & -z_\xi \\ -r_\eta & r_\xi \end{pmatrix}\begin{pmatrix} p_\xi \\ p_\eta \end{pmatrix}$$

$$= gJ^{-1}T^T \nabla_\Xi p.$$

$$\nabla \cdot u = J^{-1}\nabla_\Xi \cdot \bar{u}. \quad (16)$$

$$\nabla_\Xi \cdot \bar{u} = \nabla_\Xi \cdot \left[g\begin{pmatrix} z_\eta & -r_\eta \\ -z_\xi & r_\xi \end{pmatrix}\begin{pmatrix} u \\ v \end{pmatrix}\right] \quad (17)$$

$$= g_{,\xi}(uz_\eta - vr_\eta) + g(uz_\eta - vr_\eta)_{,\xi} + g_{,\eta}(vr_\xi - uz_\xi) + g(vr_\xi - uz_\xi)_{,\eta}$$

$$= 2\pi[(r_\xi z_\eta - r_\eta z_\xi)u + r(u_\xi z_\eta - u_\eta z_\xi - v_\xi r_\eta + v_\eta r_\xi)]$$

$$= 2\pi\{(r_\xi z_\eta - r_\eta z_\xi)u + r[z_\eta(u_r r_\xi + u_z z_\xi) - z_\xi(u_r r_\eta + u_z z_\eta) - r_\eta(v_r r_\xi + v_z z_\xi) + r_\xi(v_r r_\eta + v_z z_\eta)]\}$$

$$= 2\pi[(r_\xi z_\eta - r_\eta z_\xi)u + r(r_\xi z_\eta - r_\eta z_\xi)(v_r + v_z)]$$

$$= J\nabla \cdot u.$$

$$(u \cdot \nabla)u = [u \cdot (gJ^{-1}T^T \nabla_\Xi)]u \quad (18)$$
$$= J^{-1}[(gTu) \cdot \nabla_\Xi]u = J^{-1}(\bar{u} \cdot \nabla_\Xi)u.$$

$$\nabla \cdot (2\mu(\phi)\mathcal{D}) = [\nabla \mu(\phi)] \cdot [(\nabla u) + (\nabla u)^T] + \mu(\phi)\nabla \cdot [(\nabla u) + (\nabla u)^T]. \quad (19)$$

$$\nabla \cdot [(\nabla u)^T] = 0. \quad (20)$$

$$\frac{1}{\rho(\phi)\text{Re}}\nabla \cdot [2\mu(\phi)\mathcal{D}] = \quad (21)$$

$$\frac{g}{J\rho(\phi)\text{Re}}[T^T \nabla_\Xi \mu(\phi)] \cdot [gJ^{-1}T^T \nabla_\Xi u + (gJ^{-1}T^T \nabla_\Xi u)^T] + \frac{\mu(\phi)}{\rho(\phi)\text{Re}}\nabla^2 u.$$

$$\nabla \cdot \nabla u = \frac{1}{r}\begin{pmatrix} \frac{\partial}{\partial r} \\ \frac{\partial}{\partial z} \end{pmatrix} \cdot \left\{r\begin{pmatrix} u_r & v_r \\ u_z & v_z \end{pmatrix}\right\} + \begin{pmatrix} -\frac{u}{r^2} \\ 0 \end{pmatrix}. \quad (22)$$

$$\begin{pmatrix} v_r & v_r \\ u_r & v_z \end{pmatrix} = \begin{pmatrix} \xi_r & \eta_r \\ \xi_z & \eta_z \end{pmatrix}\begin{pmatrix} u_\xi & v_\xi \\ u_\eta & v_\eta \end{pmatrix} \quad (23)$$

$$= gJ^{-1}T^T\begin{pmatrix} u_\xi & v_\xi \\ u_\eta & v_\eta \end{pmatrix}.$$

-continued $$\begin{pmatrix} \frac{\partial}{\partial r} \\ \frac{\partial}{\partial z} \end{pmatrix} \cdot \begin{pmatrix} \alpha & \beta \\ \gamma & \delta \end{pmatrix} = gJ^{-1}\begin{pmatrix} \frac{\partial}{\partial \xi} \\ \frac{\partial}{\partial \eta} \end{pmatrix} \cdot \left\{\begin{pmatrix} z_\eta & -r_\eta \\ -z_\xi & r_\xi \end{pmatrix}\begin{pmatrix} \alpha & \beta \\ \gamma & \delta \end{pmatrix}\right\} \quad (24)$$

$$= gJ^{-1}\nabla_\Xi \cdot \left\{T\begin{pmatrix} \alpha & \beta \\ \gamma & \delta \end{pmatrix}\right\}.$$

$$\frac{\mu(\phi)}{\rho(\phi)\text{Re}}\nabla \cdot \nabla u = \frac{\mu(\phi)}{J\rho(\phi)\text{Re}}\nabla_\Xi \cdot \{g^2 J^{-1} TT^T \nabla_\Xi u\} + \frac{\mu(\phi)}{\rho(\phi)\text{Re}}\begin{pmatrix} -\frac{u}{r^2} \\ 0 \end{pmatrix}. \quad (25)$$

$$\frac{1}{\rho(\phi)\text{Re}}\nabla \cdot [2\mu(\phi)\mathcal{D}] = \quad (26)$$

$$\frac{g}{J\rho(\phi)\text{Re}}[T^T \nabla_\Xi \mu(\phi)] \cdot [gJ^{-1}TT^T \nabla_\Xi u] + \frac{\mu(\phi)}{\rho(\phi)\text{Re}}\begin{pmatrix} -\frac{u}{r^2} \\ 0 \end{pmatrix}.$$

$$\kappa(\phi) = \nabla \cdot \left(\frac{\nabla \phi}{|\nabla \phi|}\right) \quad (27)$$

$$= J^{-1}\nabla_\Xi \cdot \left(gT\frac{T^T \nabla_\Xi \phi}{|T^T \nabla_\Xi \phi|}\right).$$

$$-\frac{g\delta(\phi)}{J^2 \rho(\phi)We}\nabla_\Xi \cdot \left(gT\frac{T^T \nabla_\Xi \phi}{|T^T \nabla_\Xi \phi|}\right)(T^T \nabla_\Xi \phi). \quad (28)$$

$$\frac{\partial u}{\partial t} + J^{-1}(\bar{u} \cdot \nabla_\Xi)u = -\frac{1}{\rho(\phi)J}gT^T \nabla_\Xi p + (\text{Viscosity term}) - \quad (29)$$

$$\frac{1}{Fr}e_z - \frac{g\delta(\phi)}{J^2\rho(\phi)We}\nabla_\Xi \cdot \left(gT\frac{T^T \nabla_\Xi \phi}{|T^T \nabla_\Xi \phi|}\right)(T^T \nabla_\Xi \phi),$$

$$\nabla_\Xi \cdot \bar{u} = 0,$$

$$\frac{\partial \phi}{\partial t} + J^{-1}\bar{u} \cdot \nabla_\Xi \phi = 0.$$

$$u = u^{BC} \quad (30)$$

$$p = p^{BC}, \; \frac{\partial u}{\partial n} = 0. \quad (31)$$

$$u^n = u(t = n\Delta t) \quad (32)$$

$$H(\phi) = \begin{cases} 0 & \text{if } \phi < -\epsilon \\ \frac{1}{2}\left[1 + \frac{\phi}{\epsilon} + \frac{1}{\pi}\sin(\pi\phi/\epsilon)\right] & \text{if } |\phi| \leq \epsilon \\ 1 & \text{if } \phi > \epsilon \end{cases}. \quad (33)$$

$$\delta(\phi) = \frac{dH(\phi)}{d\phi} \quad (34)$$

$$\epsilon = \alpha \Delta x. \quad (35)$$

$$\phi^{n+1} = \phi^n - \frac{\Delta t}{J}[\bar{u} \cdot \nabla_\Xi \phi]^{n+1/2} \quad (36)$$

$$\phi^{n+1/2} = \frac{1}{2}(\phi^n + \phi^{n+1}). \quad (37)$$

$$\frac{u^{n+1} - u^n}{\Delta t} + J^{-1}[(\bar{u} \cdot \nabla_\Xi)u]^{n+1/2} = -\frac{g}{\rho(\phi^{n+1/2})J}T^T\nabla_\Xi p^{n+1} + \quad (38)$$

$$(\text{Viscosity term})^n + (\text{Surface tension})^{n+1/2} - \frac{1}{Fr}e_z.$$

$$u^* = u^n + \Delta t\left\{-J^{-1}[(\bar{u} \cdot \nabla_\Xi)u]^{n+1/2} + \quad (39)\right.$$

$$\left.(\text{Viscosity term})^n(\text{Surface tension})^{n+1/2} - \frac{1}{Fr}e_z\right\}.$$

$$u^{n+1} = u^* - \frac{g\Delta t}{\rho(\phi^{n+1/2})J}T^T \nabla_\Xi p^{n+1}. \quad (40)$$

-continued $$u^{n+1} = u^* - \frac{\Delta t}{\rho(\phi^{n+1/2})} \nabla p^{n+1}. \quad (41)$$

$$\nabla \cdot u^* = \nabla \cdot \left( \frac{\nabla t}{\rho(\phi^{n+1/2})} \nabla p^{n+1} \right). \quad (42)$$

$$\int_\Omega u^* \cdot \nabla \psi dx = \int_\Omega \frac{\Delta t}{\rho(\phi^{n+1/2})} \nabla p^{n+1} \cdot \nabla \psi dx + \int_{\Gamma_1} \psi u^{BC} \cdot n dS. \quad (43)$$

$$\frac{\Delta t}{\rho(\phi^{n+1/2})} \frac{\partial p^{n+1}}{\partial n} = (u^* - u^{BC}) \cdot n \quad (44)$$

$$\phi_{t'} + F|\phi| = 0 \quad (45)$$

$$\frac{1}{4}(X_{i-1,j-1} + X_{i-1,j} + X_{i,j-1} + X_{i,j}) \quad (46)$$

$$(X_\xi)_{i,j} = \frac{1}{2}(X_{i,j} - X_{i-1,j} + X_{i,j-1} - X_{i-1,j-1}). \quad (47)$$

$$[(\bar{u} \cdot \nabla_\Xi)u]_{i,j}^{n+1/2} = \frac{\bar{u}_{i+1/2,j}^{n+1/2} + \bar{u}_{i-1/2,j}^{n+1/2}}{2}(u_{i+1/2,j}^{n+1/2} - u_{i-1/2,j}^{n+1/2}) + \quad (48)$$
$$\frac{\bar{v}_{i,j+1/2}^{n+1/2} + \bar{v}_{i,j-1/2}^{n+1/2}}{2}(u_{i,j+1/2}^{n+1/2} - u_{i,j-1/2}^{n+1/2}),$$

$$[(\bar{u} \cdot \nabla_\Xi)\phi]_{i,j}^{n+1/2} = \frac{\bar{u}_{i+1/2,j}^{n+1/2} + \bar{u}_{i-1/2,j}^{n+1/2}}{2}(\phi_{i+1/2,j}^{n+1/2} - \phi_{i-1/2,j}^{n+1/2}) + \quad (49)$$
$$\frac{\bar{v}_{i,j+1/2}^{n+1/2} + \bar{v}_{i,j-1/2}^{n+1/2}}{2}(\phi_{i,j+1/2}^{n+1/2} - \phi_{i,j-1/2}^{n+1/2}).$$

$$u_{i+1/2,j}^{n+1/2,L} = u_{i,j}^n + \frac{1}{2}u_{\xi,i,j}^n + \frac{\Delta t}{2}u_{t,i,j}^n \quad (50)$$
$$= u_{i,j}^n + \left( \frac{1}{2} - \frac{\Delta t}{2J_{i,j}} \bar{u}_{i,j}^n \right) u_{\xi,i,j}^n - \frac{\Delta t}{2J_{i,j}} (\bar{v}u_\eta)_{i,j}^n + \frac{\Delta t}{2} F_{i,j}^n$$

$$F_{i,j}^n = \quad (51)$$
$$\left\{ -\frac{g}{\rho(\phi)J} \nabla_\Xi p + (Viscosity\ term) + (Surface\ tension) - \frac{1}{Fr} e_2 \right\}_{i,j}^n.$$

$$u_{i+1/2,j}^{n+1/2,R} = u_{i+1,j}^n + \frac{1}{2}u_{\xi,i+1,j}^n + \frac{\Delta t}{2}u_{t,i+1,j}^n \quad (52)$$
$$= u_{i+1,j}^n + \left( \frac{1}{2} - \frac{\Delta t}{2J_{i+1,j}} \bar{u}_{i+1,j}^n \right) u_{\xi,i+1,j}^n - $$
$$\frac{\Delta t}{2J_{i+1,j}} (\bar{v}u_\eta)_{i+1,j}^n + \frac{\Delta t}{2} F_{i+1,j}^n.$$

$$\bar{u}_{i+1/2,j}^{n+1/2} = \quad (53)$$
$$\begin{cases} \bar{u}_{i+1/2,j}^{n+1/2,L} & \text{if } \bar{u}_{i+1/2,j}^{n+1/2,L} > 0 \text{ and } \bar{u}_{i+1/2,j}^{n+1/2,L} + \bar{u}_{i+1/2,j}^{n+1/2,R} > 0 \\ \bar{u}_{i+1/2,j}^{n+1/2,R} & \text{if } \bar{u}_{i+1/2,j}^{n+1/2,R} < 0 \text{ and } \bar{u}_{i+1/2,j}^{n+1/2,L} + \bar{u}_{i+1/2,j}^{n+1/2,R} < 0 \\ 0 & \text{otherwise} \end{cases}$$

$$u_{i+1/2,j}^{n+1/2}(\text{or } \phi_{i+1/2,j}^{n+1/2}) = \quad (54)$$
$$\begin{cases} u_{i+1/2,j}^{n+1/2,L}(\text{or } \phi_{i+1/2,j}^{n+1/2,L}) & \text{if } \bar{u}_{i+1/2,j}^{n+1/2} > 0 \\ u_{i+1/2,j}^{n+1/2,R}(\text{or } \phi_{i+1/2,j}^{n+1/2,R}) & \text{if } \bar{u}_{i+1/2,j}^{n+1/2} < 0 \\ \frac{u_{i+1/2,j}^{n+1/2,L} + u_{i+1/2,j}^{n+1/2,R}}{2} \left( \text{or } \frac{\phi_{i+1/2,j}^{n+1/2,L} + \phi_{i+1/2,j}^{n+1/2,R}}{2} \right) & \text{if } \bar{u}_{i+1/2,j}^{n+1/2} = 0. \end{cases}$$

$$u^e - \frac{1}{\rho(\phi^n)} \nabla q \quad (55)$$

$$\nabla \cdot \left( \frac{1}{\rho(\phi^n)} \nabla q \right) = \nabla \cdot u^e. \quad (56)$$

$$\nabla_\Xi \cdot \bar{u}^e = \nabla_\Xi \cdot \left( \frac{g^2}{\rho(\phi^n)J} TT^T \nabla_\Xi q \right). \quad (57)$$

-continued $$q = \Delta t p^{BC}(t^{n+1/2}) \quad (58)$$

$$u^e \leftarrow u^e - \frac{g^2}{\rho(\phi^n)J} TT^T \nabla_\Xi q. \quad (59)$$

$$D_\xi^c(u)_{i,j} = (u_{i+1,j} - u_{i-1,j})/2 \quad (60)$$
$$D_\xi^+(u)_{i,j} = (u_{i+1,j} - u_{i,j}),$$
$$D_\xi^-(u)_{i,j} = (u_{i,j} - u_{i-1,j}).$$

$$\delta_{\lim}(u)_{i,j} = \begin{cases} \min(2|D_\xi^-(u)_{i,j}|, 2|D_\xi^+(u)_{i,j}|) & \text{if } (D_\xi^-(u)_{i,j})(D_\xi^+(u)i,j) > 0 \\ 0 & \text{otherwise,} \end{cases} \quad (61)$$

$$(u_\xi)_{i,j} = \min(|D_\xi^c(u)_{i,j}|, \delta_{\lim}(u)_{i,j}) \times sign(D_\xi^c(u)_{i,j}). \quad (62)$$

$$(\bar{v}u_\eta)_{i,j}^n = \max(\bar{v}_{i,j}^n, 0)(u_{i,j}^n - u_{i,j-1}^n) + \min(\bar{v}_{i,j}^n, 0)(u_{i,j+1}^n - u_{i,j}^n). \quad (63)$$

$$(\alpha u_\xi)_\xi + (\beta u_\xi)_\eta + (\beta u_\eta)_\xi + (\gamma u_\eta)_\eta, \quad (64)$$

$$\alpha = g^2 J^{-1}(x_\eta^2 + y_\eta^2), \beta = -g^2 J^{-1}(x_\xi x_\eta + y_\xi y_\eta), \gamma = g^2 J^{-1}(x_\xi^2 + y_\xi^2). \quad (65)$$

$$\Delta t < \quad (66)$$
$$\min_{i,j} \left[ \frac{\Delta \tau}{u}, \frac{\Delta z}{v}, \sqrt{We \frac{\rho_1 + \rho_2}{8\pi} h^{3/2}}, \frac{Re}{2} \frac{\rho^n}{\mu^n} \left( \frac{1}{\Delta r^2} + \frac{1}{\Delta z^2} \right)^{-1}, \sqrt{\frac{2h}{|F|}} \right],$$

$$\rho_1 = 1070\ Kg/m^3, \mu_1 = 3.7 \times 10^{-3}\ Kg/m \cdot sec, \sigma = 0.032\ Kg/sec^2 \quad (67)$$

$$Re = 43.4, We = 30.1 \quad (68)$$

What is claimed is:

1. A method for simulating and analyzing two-phase fluid flow through at least a portion of, and ejection from, a channel through at least the portion of which an interface between a first fluid in a first phase and a second fluid in a second phase moves, the method comprising the steps of:
   (a) performing finite difference analysis, with reference to both a quadrilateral grid in a physical space and a uniform square grid in a computational space, equations governing two-phase fluid flow including a level set convection equation having a level set function for the flow of the first and second fluids through at least the portion of the channel, the level set function taking into consideration the effect of the interface as it moves through at least the portion of the channel, wherein the equations are first derived for the quadrilateral grid in the physical space and then transformed to the computational space for application on the uniform square grid on which the equations are solved; and
   (b) simulating the flow of the first fluid through at least the portion of, and ejection from, the channel based on the performed finite difference analysis.

2. The method of claim 1, wherein the first fluid is ink, the second fluid is air, and the channel comprises an ink-jet nozzle that is part of a piezoelectric ink-jet head.

3. A method for simulating and analyzing two-phase fluid flow through at least a portion of, and ejection from, a channel through at least the portion of which an interface between a first fluid in a first phase and a second fluid in a second phase moves, the method comprising the steps of:
   (a) deriving partial differential equations, including a level set convection equation having a level set function, applicable to a quadrilateral grid in a physical space, including deriving a viscosity term, a surface tension term, and a level set convection equation for two-phase flows;

(b) calculating a transformation for transforming the derived partial differential equations for application to a uniform square grid in a computational space; and (c) solving the derived and transformed partial differential equations to determine the flow of the first fluid through at least the portion of, and ejection from, the channel, wherein the level set function takes into consideration the interface as it moves.

4. The method of claim 3, wherein in step (c) the derivatives of velocity, pressure, and the level set function for the flow of the first fluid in the derived and transformed partial differential equations are calculated with reference to the uniform square grid in the computational space.

5. The method of claim 3, wherein the first fluid is ink, the second fluid is air, and the channel comprises an ink-jet nozzle that is part of a piezoelectric ink-jet head.

6. An apparatus for simulating and analyzing two-phase fluid flow through at least a portion of, and ejection from, a channel through at least the portion of which an interface between a first fluid in a first phase and a second fluid in a second phase moves, the apparatus comprising:

means for performing finite difference analysis, with reference to both a quadrilateral grid in a physical space and a uniform square grid in a computational space, equations governing two-phase fluid flow including a level set convection equation having a level set function for the flow of the first and second fluids through at least the portion of the channel, the level set function taking into consideration the effect of the interface as it moves through at least the portion of the channel, wherein the equations are first derived for the quadrilateral grid in the physical space and then transformed to the computational space for application on the uniform square grid on which the equations are solved; and means for simulating the flow of the first fluid through at least the portion of, and ejection from, the channel based on the performed finite difference analysis.

7. The apparatus of claim 6, wherein the performing means comprises a program of instructions embodied in software, hardware, or combination thereof.

8. The apparatus of claim 6, wherein the simulating means comprises a display for visually observing the simulation.

9. The apparatus of claim 6, wherein the first fluid is ink, the second fluid is air, and the channel comprises an ink-jet nozzle that is part of a piezoelectric ink-jet head.

10. An apparatus for simulating and analyzing two-phase fluid flow through at least a portion of, and ejection from, a channel through at least the portion of which an interface between a first fluid in a first phase and a second fluid in a second phase moves, the apparatus comprising:

means for deriving partial differential equations, including a level set convection equation having a level set function, applicable to a quadrilateral grid in a physical space, including deriving a viscosity term, a surface tension term, and a level set convection equation for two-phase flows;

means for calculating a transformation for transforming the derived partial differential equations for application to a uniform square grid in a computational space; and means for solving the derived and transformed partial differential equations to determine the flow of the first fluid through at least the portion of, and ejection from, the channel, wherein the level set function takes into consideration the interface as it moves.

11. The apparatus of claim 10, wherein the solving means calculates, with reference to the uniform square grid in the computational space, the derivatives of velocity, pressure, and the level set function for the flow of the first fluid in the derived and transformed partial differential equations.

12. The apparatus of claim 10, wherein the first fluid is ink, the second fluid is air, and the channel comprises an ink-jet nozzle that is part of a piezoelectric ink-jet head.

13. A storage medium having a program of instructions for directing a machine to perform a method for simulating and analyzing two-phase fluid flow through at least a portion of, and ejection from, a channel through at least the portion of which an interface between a first fluid in a first phase and a second fluid in a second phase moves, the program of instructions comprising instructions for:

(a) performing finite difference analysis, with reference to both a quadrilateral grid in a physical space and a uniform square grid in a computational space, equations governing two-phase fluid flow including a level set convection equation having a level set function for the flow of the first and second fluids through at least the portion of the channel, the level set function taking into consideration the effect of the interface as it moves through at least a portion of the channel, wherein the equations are first derived for the quadrilateral grid in the physical space and then transformed to the computational space for application on the uniform square grid on which the equations are solved; and (b) simulating the flow of the first fluid through at least the portion of, and ejection from, the channel based on the performed finite difference analysis.

14. The storage medium of claim 13, wherein the first fluid is ink, the second fluid is air, and the channel comprises an ink-jet nozzle that is part of a piezoelectric ink-jet head.

15. A storage medium having a program of instructions for directing a machine to perform a method for simulating and analyzing two-phase fluid flow through at least a portion of, and ejection from, a channel through which at least the portion of which an interface between a first fluid in a first state and a second fluid in a second state moves, the program of instructions comprising instructions for:

(a) deriving partial differential equations, including a level set convection equation having a level set function, applicable to a quadrilateral grid in a physical space, including deriving a viscosity term, a surface tension term, and a level set convection equation for two-phase flows;

(b) calculating a transformation for transforming the derived partial differential equations for application to a uniform square grid in a computational space; and (c) solving the derived and transformed partial differential equations to determine the flow of the first fluid through at least the portion of, and ejection from, the channel, wherein the level set function takes into consideration the interface as it moves.

16. The storage medium of claim 15, wherein in instructions (c) the derivatives of velocity, pressure, and the level set function for the flow of the first fluid in the derived and transformed partial differential equations are calculated with reference to the uniform square grid in the computational space.

17. The storage medium of claim 15, wherein the first fluid is ink, the second fluid is air, and the channel comprises an ink-jet nozzle that is part of a piezoelectric ink-jet head.

* * * * *